US005823874A

United States Patent [19]

Adams

[11] Patent Number: 5,823,874

[45] Date of Patent: Oct. 20, 1998

[54] METHOD OF PLAYING GAME AND GAMING DEVICE WITH AN ADDITIONAL PAYOUT INDICATOR

[75] Inventor: William R. Adams, Las Vegas, Nev.

[73] Assignee: Anchor Gaming, Las Vegas, Nev.

[21] Appl. No.: 622,430

[22] Filed: Mar. 25, 1996

[51] Int. Cl.$^6$ ........ G02F 17/34

[52] U.S. Cl. ........ 463/17; 463/21

[58] Field of Search ........ 463/17, 21, 22, 463/23, 25, 26, 27

[56] References Cited

U.S. PATENT DOCUMENTS

| | | | |
|---|---|---|---|
| 3,281,149 | 10/1966 | Miller | 463/22 |
| 4,805,907 | 2/1989 | Hagiwara | 463/26 |
| 4,871,171 | 10/1989 | Rivero . | |
| 5,205,555 | 4/1993 | Hamano . | |
| 5,259,616 | 11/1993 | Bergmann | 463/26 |
| 5,342,049 | 8/1994 | Wichinsky et al. . | |
| 5,344,145 | 9/1994 | Chadwick et al. . | |

FOREIGN PATENT DOCUMENTS

| | | |
|---|---|---|
| 0333338 | 9/1989 | European Pat. Off. . |
| 1474617 | 3/1967 | France . |
| 3700861 | 7/1988 | Germany . |
| 4014477 | 7/1991 | Germany . |
| 1242298 | 8/1971 | United Kingdom . |
| 2066991 | 7/1981 | United Kingdom . |
| 2072395 | 9/1981 | United Kingdom . |
| 2084371 | 4/1982 | United Kingdom . |
| 2201821 | 9/1988 | United Kingdom . |
| 2202984 | 10/1988 | United Kingdom . |

OTHER PUBLICATIONS

*An Illustrated Price Guide to the 100 Most Collectible Trade Stimulators* By: Richard M. Bueschel; pp. 21, 29, 83; Published in U.S., 1978.

*Slots 1*; By; Richard M. Bueschel; pp. 136, 142; published in U.S. in 1978, Revised in 1981 and 1988.

Ad and Cover of *Intergaming* Magazine, Published in England in Jun., 1995.

*Slot Machines on Parade*, By: Robert N. Geddes; p. 128; Published in U.S. Oct. 1980.

*Slot Machines*, By: Marshall Fey; pp. 126 and 150; Published in Reno, Nevada in 1983, 2nd 1989, 3rd 1991.

Cover and pp. 91 and 101 of *Intergame* Magazine Published in England in Jun., 1995.

Advertisement, Bally Distributiong Company Double or Nothing, Model 1083, Chapter 11–1975–1984, p. 267.

*Primary Examiner*—George Manuel

*Attorney, Agent, or Firm*—Galgano & Burke

[57] ABSTRACT

Gaming devices comprising a standard gaming unit, e.g., three reels, and a discernible additional payout indicator, e.g., a rotatable wheel. A preferred bonus payout indicator is clearly visible by the player and is actuatable when the reels of the slot machine stop on certain predetermined indicia. A preferred embodiment further comprises a payout multiplier which displays a plurality of values by which a payout may be multiplied.

41 Claims, 3 Drawing Sheets

METHOD OF PLAYING GAME AND GAMING DEVICE WITH AN ADDITIONAL PAYOUT INDICATOR

The present invention is directed to novel gaming devices and, more particularly, to gaming devices comprising at least one bonus indicator capable of indicating at least one of a plurality of bonuses.

BACKGROUND OF THE INVENTION

Games of chance have been enjoyed by people for thousands of years and have enjoyed widespread popularity in recent times. Many people enjoy playing a wide variety of games that they have not played before. Playing new games adds to the excitement of this recreational activity particularly when some form of "gaming" is involved. As used herein, the term "gaming" and "gaming devices" are used to indicate that some form of wagering is involved, and that players must make wagers of value, whether actual currency or some equivalent of value, e.g., token or credit.

One popular game of chance that has long been enjoyed by many players is the slot machine. Conventionally, a slot machine is configured for a player to input something of value, e.g., a standard denomination of currency or house token or other representation of currency or credit, and then to permit the player to activate the device which causes a plurality of reels to spin and ultimately stop to display a random combination of some form of indicia, for example, numbers or symbols. If this display contains one of a preselected plurality of winning combinations, the machine releases money into a payout chute or onto a credit meter for the player. For example, if a player initially wagered two coins of a national currency and that player won a high payout, that player may receive fifty coins of the same denomination in return.

Since it is desirable to offer players games which they have not played before, it would be desirable to provide a player with new games and additional opportunities to receive winning payouts.

Those familiar with games involving winning payouts, such as the popular television game show entitled "WHEEL OF FORTUNE" will realize that as players and observers watch a large wheel spin and gradually come to rest, the players experience a heightened feeling of anticipation and excitement as the wheel is slowing down to indicate a possible prize.

It would therefore also be desirable to provide a payout indicator which is discernible by a player and/or other observers.

SUMMARY OF THE INVENTION

Various embodiments of the present invention comprise gaming devices having a first gaming unit, e.g., rotatable reels and at least one discernible indicia of a mechanical bonus payout indicator. According to the most preferred embodiments, the bonus payout indicator is clearly visible to a player and is operable when primary reels of a slot machine stop on certain predetermined indicia. According to one preferred embodiment of the present invention, a bonus indicator is in the form of a rotatable bonus wheel which can be caused to spin automatically or in response to some action by a player, e.g., the player pushing a button, when the primary reels indicate one of a predetermined plurality of indicia. When the wheel stops, a pointer indicates the bonus payout to be awarded to the player.

Another preferred embodiment of the present invention further comprises a discernible multiplier which provides the ability to change either the payout from the primary gaming unit or the bonus indicator, or both. As described in more detail below, it is within the scope of the present invention to provide a payout from the primary gaming unit, a payout indicated by the bonus indicator only, a payout from the primary gaming unit or the bonus indicator as changed by the multiplier, or a separate, plurality of payouts from the primary gaming unit and the bonus indicator either with or without modification by a multiplier.

According to one preferred embodiment of the present invention, the mechanical bonus payout indicator is electromechanically operated and is linked to a random number generator which determines where the bonus indicator actually stops.

According to another preferred embodiment of the present invention, when the primary reels stop on one of a predetermined plurality of winning indicia sets, a bonus actuator is placed in an active state. According to this embodiment, a person, such as the player, must actuate the actuator in order to operate the bonus indicator.

According to another embodiment of the present invention, the bonus actuator requires operator intervention so that a player must involve a casino attendant who can activate the bonus indicator.

According to another preferred embodiment of the present invention, the bonus indicator is connected to a drive mechanism which gradually reduces the rate of spin of the bonus wheel before the bonus wheel stops.

Still other embodiments of the present invention comprise gaming devices having electronic means for displaying indicia of rotatable reels such as a video screen and/or means for displaying indicia of a bonus payout indicator, such as a video screen. The present invention also comprises methods for playing a game of chance. One preferred method comprises the steps of a first, standard gaming unit for displaying a randomly selected combination of indicia, said displayed indicia selected from the group consisting of slot reels, indicia of reels, indicia of playing cards, and combinations thereof; said first, standard gaming unit comprising means for generating at least one signal corresponding to at least one select display of indicia; means for providing at least one discernible indicia of a mechanical bonus indicator, said bonus indicator indicia providing means indicating at least one of a plurality of possible bonuses, wherein said bonus indicator indicia providing means is operatively connected to said first, standard gaming unit and actuatable in response to said signal.

Further embodiments of the present invention comprises a method of conducting a game of chance comprising the steps of providing a player with an opportunity to place a wager; displaying a randomly selected combination of indicia, said displayed indicia selected from the group consisting of reels, indicia of reels, indicia of playing cards, and combination thereof; generating at least one signal corresponding to at least one select display of said indicia; providing at least one discernible indicia of a mechanical bonus indicator, said bonus indicator indicia indicating at least one of a plurality of possible bonuses, wherein said bonus indicator indicia is in the form of a wheel or reel and is actuatable in response to said signal.

DETAILED DESCRIPTION

Figure 1:
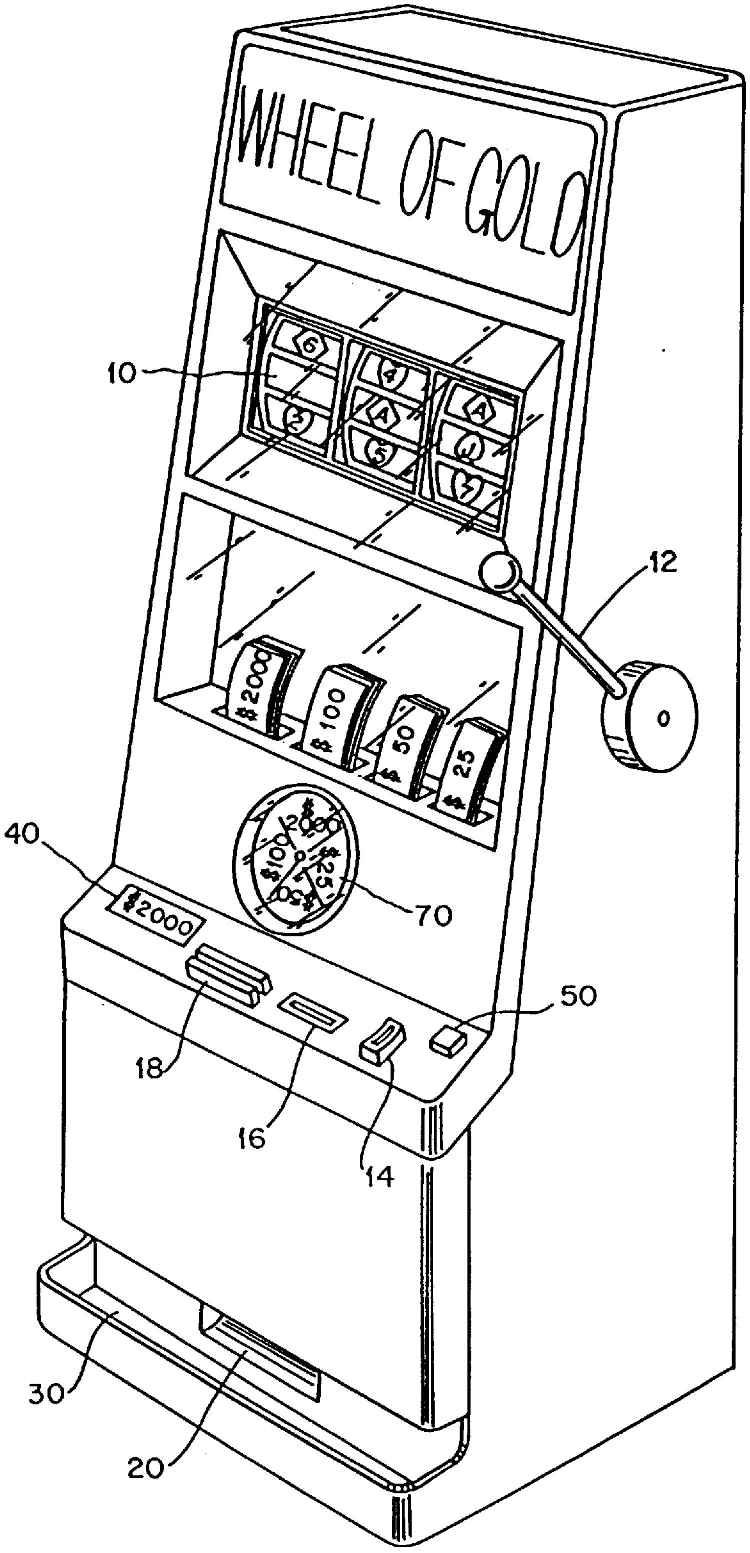
FIG. 1 is a perspective view one of a gaming device of one embodiment of the present invention.

The various embodiments of the present invention are designed to provide added excitement to a gaming device in order to increase the enjoyment to players and to serve as an added attraction to potential players. One preferred embodiment of the present invention, illustrated in FIG. 1, comprises a primary gaming unit which comprises three rotatable reels 10, each of which comprise a plurality of indicia on the periphery thereof. The illustrated gaming device comprises a mechanical lever 12, coin slot 14, currency validator 16 and a credit card validator 18. In a manner which will be recognized by those skilled in the art, each reel 10 is designed to rotate and then stop in order to visually display at least one, and preferably a number of indicia. If the collection of indicia displayed by the three reels is one of a predetermined plurality of winning indicia sets, then the player can typically be provided with a winning payout either through coin chute 20 which deposits winnings into a coin trough 30 or by increasing the player's credits in a credit window 40.

According to one aspect of the present invention, when the reels 10 display a particular indicia set then the player is provided with an opportunity for a bonus. According to this illustrated embodiment of the present invention, a bonus actuator button 50 is placed in an operative state when reels 10 display a bonus indicia set. A player must then depress bonus actuator 50 in order to start bonus indicator 70 spinning. In the illustrated embodiment, bonus indicator 70 is in the form of a rotatable wheel. The wheel may be a carnival-type wheel comprising pegs and a clapper or could take one or more other forms, such as a fanciful wheel typically used in a roulette game as shown in the embodiment of FIG. 2. The facing surface of bonus indicator 70 of FIG. 1 comprises four distinct areas bearing indicia of the bonus payout to the player. In the illustrated embodiment, the bonus indicator has areas indicating bonuses of $25.00, $50.00, $100.00, and $2,000.00. When bonus indicator 70 stops, an indicator (not shown) will indicate the area on the bonus wheel corresponding to the amounts of the bonus to be provided to the player.

In a manner which will be appreciated by those skilled in the art, bonus indicator 70 can be operatively linked to a "payout" mechanism which provides a bonus payout to a player through currency chute 20 or by increasing the amount of winnings shown in credit window 40. As stated above, the payout of the bonus indicator can be in addition to a standard payout by the primary gaming unit or can be in place of the payout normally associated with the primary gaming unit.

Those familiar with gaming and game shows, will appreciate that players and observers typically experience a heightened level of anticipation and excitement as they observe one or more moving objects approaching a winning position. It is therefore most preferred for the bonus indicator of the present invention to be readily discernible, e.g., clearly visible and/or audible to the player.

According to another preferred embodiment of the present invention, a bonus indicator is connected to a electromechanical control unit, for example a motor, which gradually decreases the rate of movement of the bonus indicator before the bonus indicator stops. According to this embodiment of the present invention, players can be provided with a realistic sense of a totally mechanical indicator. Those skilled in the art will appreciate that such a control unit can also readily be connected to a random generator which will randomly select the winning payout according to a predetermined frequency of occurrence for each individual bonus payout, and then cause the bonus indicator to stop at the desired area.

According to another embodiment of the present invention, when reels 10 display an indicia set which will provide a bonus, the bonus indicator becomes activatable but requires intervention by a house attendant, such as a casino attendant, in order to actuate the bonus indicator. According to this embodiment of the present invention, the casino is provided with greater control over the actuation of the bonus indicator and, if desired, can accompany the actuation of the bonus indicator with great fanfare. It will be appreciated that the amounts of the bonus indicated in the figures are merely for purposes of illustration and, if desired, one of the amounts on the bonus indicator can have a significantly greater value. For example, one of the areas on the bonus indicator may correspond to a new automobile, a luxury vacation or a very large sum of money.

Figure 2:
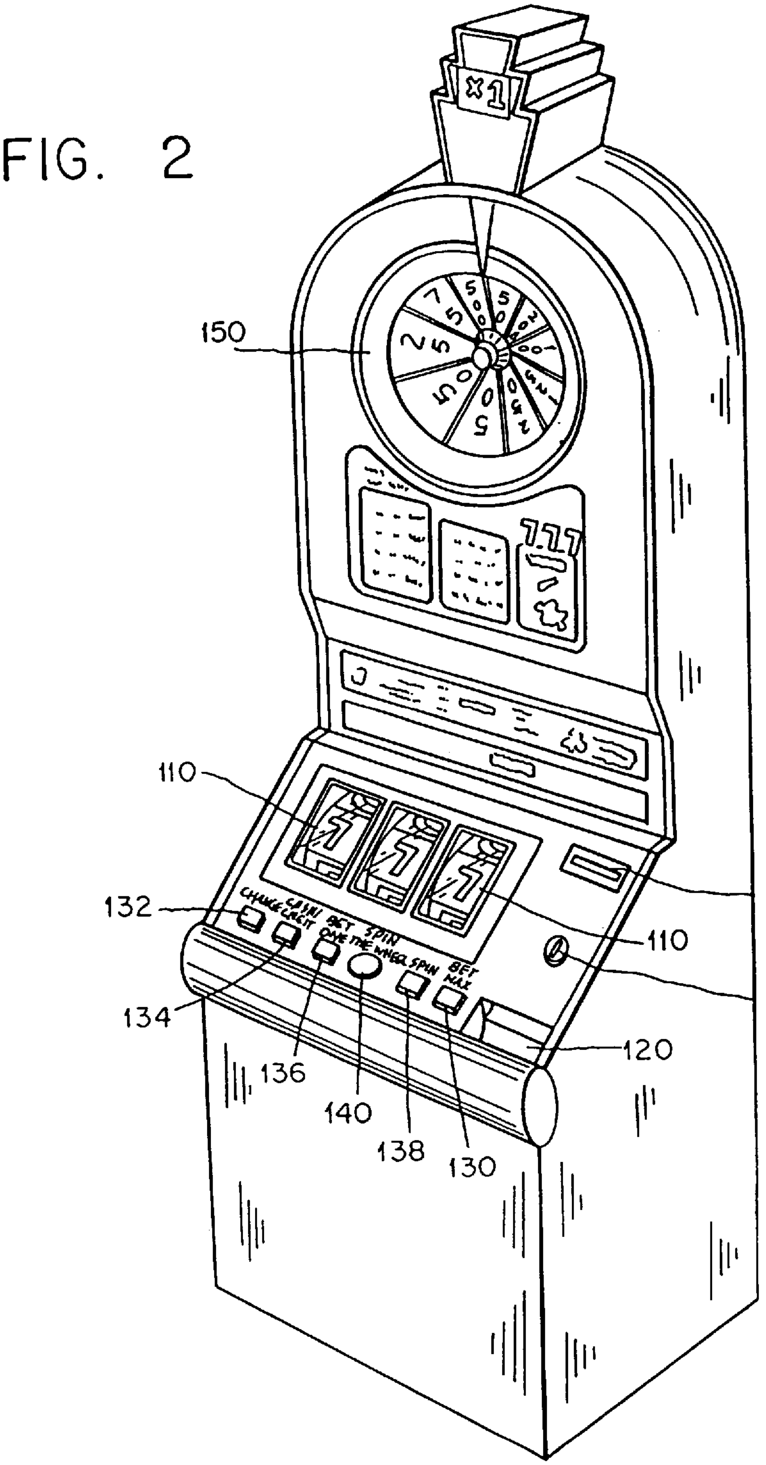
FIG. 2 is another embodiment of a gaming device of the present invention.

While the illustrated embodiment of the present invention in FIG. 1 is generally in the form of a rotatable wheel, other visible, mechanical indicia can be provided, whether controlled totally mechanically, electro-mechanically, or electronically without departing from the scope of the present invention.

As shown in FIG. 1, in order to provide additional levels of excitement, indicia of the possible bonuses are preferably visibly displayed within the slot machine. For example, in the illustrated embodiment, a shelf is preferably displayed comprising piles of currency equal to the amounts on the bonus indicator. While actual cash is preferred, the slot machine may also be provided with fake currency or simply indicia of actual currency or the other bonus prizes.

A preferred embodiment of the present invention is illustrated in FIG. 2 wherein a gaming device 100 comprises a primary gaming unit in the form a standard three-reel slot machine which displays reels 110. Suitable controls and currency mechanisms including a coin slot 114, bill validator 118, payout shoot 120 are provided. Furthermore, suitable player controls including CHANGE button 132, CASH/CREDIT button 134, BET ONE button 136, SPIN button 138 and BET MAX button 130 are also provided.

In addition to these standard controls the control panel of this preferred illustrated embodiment of the present invention comprises a SPIN THE WHEEL button 140 which becomes actuatable when the primary gaming unit, as indicated by reels 110, has randomly selected one of a plurality of predetermined indicia sets. While the primary gaming unit shown in the lower portion of the cabinet of gaming device 100 will typically have the ability to provide a plurality of winning payouts, the SPIN THE WHEEL button 140 can become actuatable when the stopped reels 110 indicate some subset of the primary unit's winning indicia, when any one of the winning reel indicia are displayed, or further in response to one or more other predetermined indicia, or a combination thereof.

When the SPIN THE WHEEL button 140 is actuated by a player, bonus wheel 150 is caused to rotate and randomly select and display one of a plurality of different areas. According to the preferred illustrated embodiment, all of the bonus areas indicate an increased winning value for the player. However, it is within the scope of the present invention to provide non-monetary prizes or losing spaces wherein no additional prize is provided and/or wherein the prize normally associated with the indicia shown on the primary gaming unit reels 110 is reduced. In the illustrated embodiment, a pointer 160 advantageously indicates the result of the bonus indicator 150.

In addition to the bonus wheel 150, this preferred illustrated embodiment of the present invention also comprises a bonus multiplier 170. The multiplier 170 preferably randomly selects a value by which the bonus indicated by bonus wheel 150 is multiplied. For example, the bonus indicator 170 can have an LED screen which cycles through multipliers of "times one", "times two" and "times three" which will indicate that the bonus is as indicated, doubled, or tripled, respectively. The multiplier 170 can be programmed to select a multiplier either totally randomly or according to some other predetermined frequency of occurrence wherein certain multipliers will occur more frequently than other multipliers. While this illustrated embodiment comprises whole number multipliers, it is also within the scope of the present invention to utilize values other than whole numbers or to include multipliers which will result in a decrease in the value shown by the bonus indicator 150. For example, a multiplier sequence could include a "times zero" value. When bonus wheel indicator 150 is not in use, the multiplier LED window can be set to an attract mode wherein a message is displayed to players or potential players. For example, the LED display could show a message, either in complete form or can be set to sequentially display either words or individual letters, such as "S P I N - T H E - W H E E L".

Figure 3:
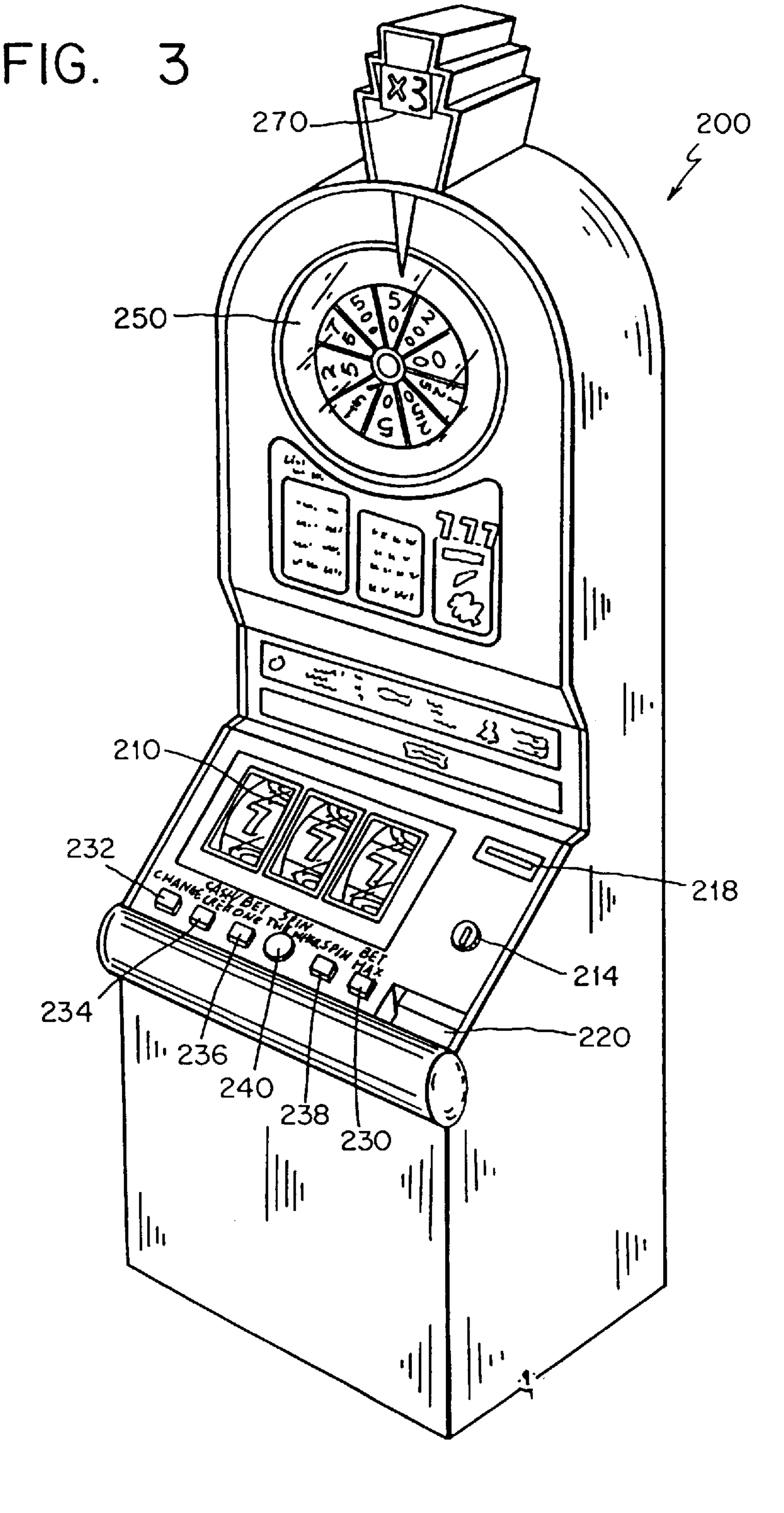
FIG. 3 illustrates an alternative embodiment of the present invention.

FIG. 3 illustrates a less preferred embodiment of the present invention wherein a gaming device 200 comprising similar controls as the controls illustrated in the embodiment of FIG. 3. In this illustrated embodiment, and wherein a bonus indicator 250 is in the form of an electronically generated image, such as a video screen or an LED display and provides discernible indicia, e.g., a visual video display, of a bonus wheel. For example, the video display can show a wheel of the type used in a roulette game such as the wheel 150 illustrated in FIG. 2.

The slot machine shown in FIG. 3 comprises a video display 210, such as a video screen, which displays three reels 110, each of which comprise a plurality of indicia. In addition, this slot machine comprises a video display 250, such as a second video screen, for displaying a bonus payout indicator. While separate screens are preferred, both the reels and the bonus payout indicator could be displayed on the same video screen. According to this embodiment of the present invention, the bonus payout indicator displays indicia of a wheel or a reel.

In a manner known in the art, the gaming device comprises a coin slot 214, a currency validator 218, and a coin chute 220. After placing a wager, a player determines the amount of his wager by either pressing the BET ONE button 236 or the BET MAX button 230. After the player has selected the amount of his wager, he depresses the SPIN button 238 which "spins" the reels shown in video display window 210.

Each indicia of a displayed reel 210 is designed to indicate rotation and then stop in order to visually display at least one, and preferably a number of indicia. When reels 210 display a particular indicia set or one of a predetermined plurality of indicia sets, then the additional payout mode is activated and video display 250 displaying payout indicator is placed in an operable state. In this illustrated embodiment, the displayed payout indicator 250 displays an indicia of a rotating wheel comprising a plurality of distinct areas bearing indicia of payouts to the player. Payout indicator 250, is caused to selectively indicate one of the plurality of indicia, either automatically, upon intervention of a casino or house attendant, or upon a player depressing SPIN THE WHEEL button 240 in order to start indicator 250 spinning. It will be appreciated that the amounts of the payout indicated in FIG. 2 are merely for purposes of illustration and, if desired, one of the amounts on the bonus indicator can have a greater value, e.g., a new automobile, a luxury vacation or large sum of money which may be collected subsequently, or lesser values, e.g., no payout.

The displayed reels 210 and displayed bonus indicator 250 can be operably controlled by suitable controls to slow down as they come to a complete stop, displaying a selected reel indicia and a bonus indicia, respectively.

The embodiment of the present invention illustrated in FIG. 2 is considered most preferable since it is believed that players prefer to see actual slot reels and an actual bonus wheel spinning in a gaming device. Other, less preferred embodiments are also possible while providing some of the advantages of the present invention. Specifically, it is feasible to replace the spinning reels with other forms of standard gaming units, for example, a visible indicia of reels or indicia of playing cards, shown for example on a video screen. It is also possible to replace the wheel with some other discernible indicia of a mechanical bonus indicator which is operatively connected to the first standard gaming unit and which either automatically commences or is actuatable in response to the result provided by the standard gaming unit. According to the present invention, both of the standard gaming unit and bonus indicator are controlled to provide random results.

From the foregoing description, it will be appreciated that embodiments of the present invention, which are specifically directed to gaming and gaming devices, comprise three different indicators. The most preferred embodiments comprise a primary (standard) gaming unit, an additional payout indicator, preferably in the form of a wheel, and a payout multiplier. While the illustrated payout multiplier of the illustrated embodiments is in the form of an electronically selected value, it is also within the scope of the present invention to have a multiplier which involves some skill on the part of a player. For example, according to an additional preferred embodiment of the present invention, a player will shoot actual projectiles, such as coins, at one or more targets in an effort to increase the value of the multiplier. In any of the embodiments of the present invention utilizing a multiplier, the multiplier can affect the value of a payout from the standard gaming unit, the additional payout indicator, or both the standard gaming unit and the payout indicator.

As stated above, the present invention also includes methods of conducting a wagering game of chance comprising the steps of providing a player with an opportunity to place a wager; displaying a randomly selected combination of indicia, said displayed indicia selected from the group consisting of reels, indicia of reels, indicia of playing cards, and combination thereof; generating at least one signal corresponding to at least one select display of said indicia; providing at least one discernible indicia of a mechanical bonus indicator, said bonus indicator indicia indicating at least one of a plurality of possible bonuses, wherein said bonus indicator indicia is in the form of a wheel or reel and is actuatable in response to said signal. A further preferred method comprises the step of displaying at least one value by which a payout may be multiplied.

What is claimed is:

1. A gaming device comprising:

a first, standard gaming unit for displaying a randomly selected combination of indicia, said displayed indicia selected from the group consisting of reels, indicia of reels, indicia of playing cards, and combinations thereof;

means for generating at least one signal corresponding to at least one select display of indicia by said first, standard gaming unit;

means for providing at least one discernible indicia of a mechanical bonus indicator, said discernible indicia indicating at least one of a plurality of possible bonuses, wherein said providing means is operatively connected to said first, standard gaming unit and becomes actuatable in response to said signal.

2. A gaming device according to claim 1 wherein said discernible indicia comprises a wheel.

3. A gaming device according to claim 2 wherein said wheel is rotatable.

4. A gaming device according to claim 1 wherein said first, standard gaming unit comprises indicia of reels.

5. A gaming device according to claim 4 wherein said discernible indicia comprises at least one reel.

6. A gaming device according to claim 1 wherein said first, standard gaming unit comprises indicia of reels.

7. A gaming device according to claim 1 wherein said first, standard gaming unit comprises indicia of playing cards.

8. A gaming device according to claim 1 further comprising means for generating at least one discernible indicia of a payout multiplier.

9. A gaming device according to claim 8 wherein said multiplier generating means broadcasts a plurality of values by which a payout may be multiplied.

10. A gaming device according to claim 8 wherein said multiplier generating means broadcasts at least one message other than a multiplier by which a payout may be multiplied.

11. A gaming device according to claim 8 wherein said multiplier generating means is randomly controlled.

12. A gaming device according to claim 8 wherein said multiplier generating means is controlled, at least in part, by a player's skill.

13. A gaming device according to claim 8 wherein said multiplier generating means comprises a device for shooting projectiles.

14. A gaming device according to claim 13 wherein said projectiles are coins.

15. A gaming device according to claim 1 further comprising means for receiving player input, said input receiving means is operatively connected to said providing means for actuating said providing means, and wherein said input receiving means receives said signal.

16. A gaming device according to claim 15 further comprising means for generating at least one discernible indicia of a payout multiplier.

17. A gaming device according to claim 16 wherein said multiplier generating means broadcasts a plurality of values by which a bonus payout may be multiplied.

18. A gaming device according to claim 16 wherein said multiplier generating means broadcasts at least one message other than a multiplier by which a bonus payment may be multiplied.

19. A gaming device according to claim 16 wherein said multiplier generating means is randomly controlled.

20. A gaming device according to claim 16 wherein said multiplier generating means is controlled, at least in part, by a player's skill.

21. A gaming device according to claim 1 wherein said providing means comprises a video screen.

22. A gaming device according to claim 21 wherein said providing means comprises an audio speaker.

23. A gaming device according to claim 1 wherein said providing means comprises an audio speaker.

24. A gaming device comprising:

a first, standard gaming unit for displaying a randomly selected combination of indicia, said displayed indicia selected from the group consisting of reels, indicia of reels, indicia of playing cards, and combinations thereof;

means for generating at least one signal corresponding to at least one select display of indicia;

means for providing at least one discernible indicia of a mechanical payout indicator, said providing means indicating at least one of a plurality of possible additional payouts, wherein said providing means is operatively connected to said first, standard gaming unit and actuatable in response to said signal; and means for generating at least one discernible indicia of a payout multiplier.

25. A gaming device according to claim 24 wherein said multiplier generating means broadcasts a plurality of values by which a payout may be multiplied.

26. A method of conducting a wagering game of chance comprising the steps of:

providing a player with an opportunity to place a wager;

displaying a randomly selected combination of indicia, said displayed indicia selected from the group consisting of reels, indicia of reels, indicia of playing cards, and combination thereof;

generating at least one signal corresponding to at least one select display of said indicia;

providing at least one discernible indicia of a mechanical bonus indicator, said bonus indicator indicia indicating at least one of a plurality of possible bonuses, wherein said bonus indicator indicia is in the form of a wheel or reel and is actuatable in response to said signal.

27. A method of conducting a game of chance according to claim 26 wherein said displaying step comprises displaying a plurality of reels.

28. A method of conducting a game of chance according to claim 27 wherein said providing step comprises displaying a plurality of bonus indicia on a wheel.

29. A method of conducting a game of chance according to claim 26 wherein said providing step comprises displaying a plurality of bonus indicia on a wheel.

30. A method of conducting a game of chance according to claim 26 further comprising the step of displaying at least one value by which a payout may be multiplied.

31. A method of conducting a game of chance according to claim 26 further comprising the step of displaying a plurality of values by which a payout may be multiplied.

32. A gaming device comprising:

a first, standard gaming unit for displaying a randomly selected combination of indicia, said displayed indicia selected from the group consisting of reels, indicia of reels, indicia of playing cards, and combinations thereof;

means for generating at least one signal corresponding to at least one select display of indicia by said first, standard gaming unit;

means for indicating an additional possible payout, said additional payout indicating means continuously displaying a plurality of possible additional payouts and comprising means for indicating whether at least one of said plurality of additional payouts will be provided to a player, wherein said additional payout indicating means is operatively connected to said first, standard gaming unit and becomes actuatable in response to said signal.

33. A gaming device according to claim 32 wherein said payout indicating means further comprises indications that a player will receive a reduced payout.

34. A gaming device according to claim 32 wherein said payout indicating means further comprises indications that a player will not receive a payout.

35. A gaming device according to claim 32 further comprising means for generating at least one discernible indicia of a payout multiplier.

36. A gaming device according to claim 35 wherein said multiplier generating means broadcasts a plurality of values by which a payout may be multiplied.

37. A gaming device according to claim 35 wherein said multiplier generating means broadcasts at least one message other than a multiplier by which a payout may be multiplied.

38. A gaming device according to claim 35 wherein said multiplier generating means is randomly controlled.

39. A gaming device according to claim 35 wherein said multiplier generating means is controlled, at least in part, by a player's skill.

40. A gaming device according to claim 35 wherein said multiplier generating means comprises a device for shooting projectiles.

41. A gaming device according to claim 40 wherein said projectiles are coins.

* * * * *

UNITED STATES PATENT AND TRADEMARK OFFICE
CERTIFICATE OF CORRECTION

PATENT NO : 5,823,874
DATED : OCTOBER 20, 1998
INVENTOR(S) : WILLIAM R. ADAMS

It is certified that error appears in the above-identified patent and that said Letters Patent are hereby corrected as shown below:

On the title page of the above-identified patent, please insert the following:

-- RELATED U.S. APPLICATION DATA

Continuation-in-part of Ser. No. 311,783, filed on September 23, 1994, now abandoned. --

Signed and Sealed this

Twenty-seventh Day of April, 1999

*Attest:*

Q. TODD DICKINSON

*Attesting Officer* *Acting Commissioner of Patents and Trademarks*